Nov. 5, 1929.  J. M. MELOTT  1,734,223
BALANCED THRUST BEARING
Filed Dec. 20, 1926
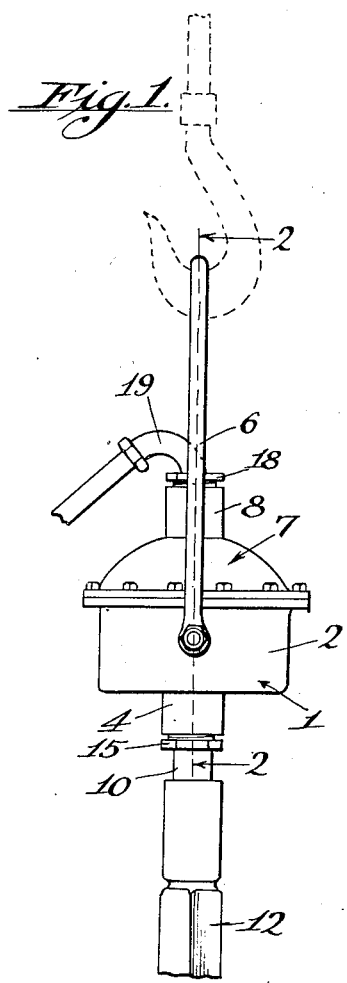
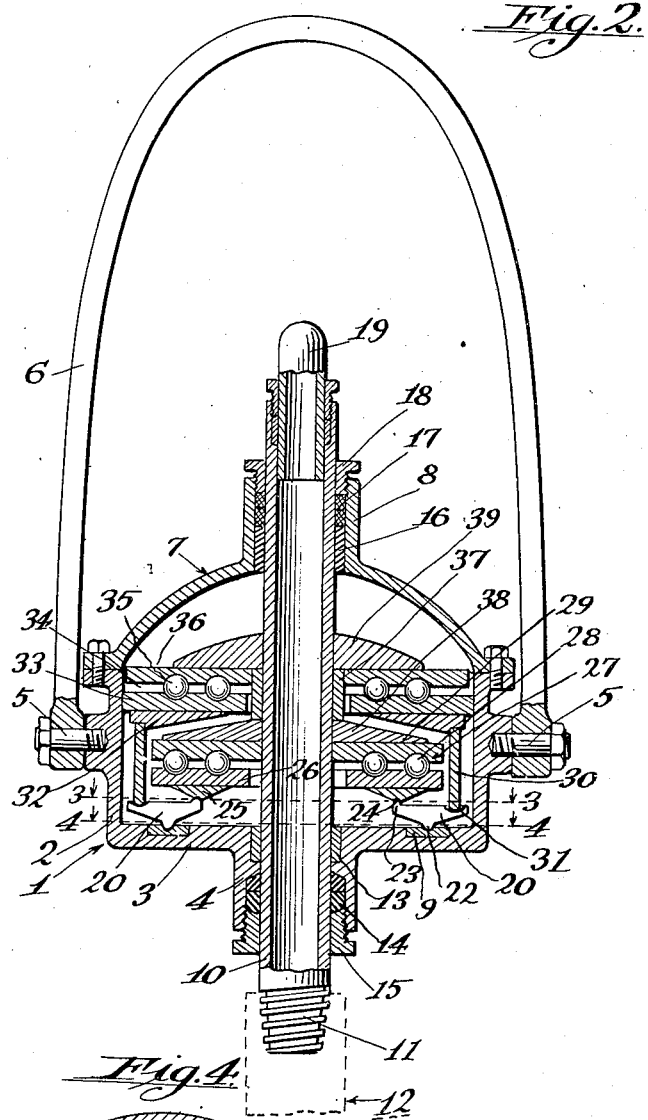
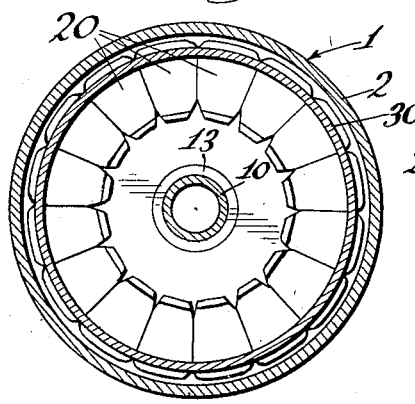
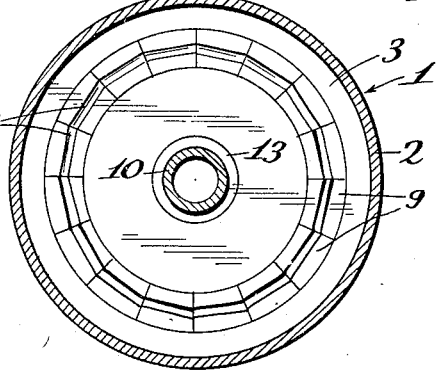
Inventor:
John M. Melott,
by Hazard and Miller
Attorneys.

Patented Nov. 5, 1929

1,734,223

UNITED STATES PATENT OFFICE

JOHN M. MELOTT, OF LOS ANGELES, CALIFORNIA

BALANCED THRUST BEARING

Application filed December 20, 1926. Serial No. 155,920.

My invention is a balanced thrust bearing in which the bearing elements are vertically positioned one relative to the other.

An object of my invention is the construction of a balanced thrust bearing in which a sufficient bearing area is provided for the weight to be supported by building up a plurality of bearings in vertical alignment, such bearings being interconnected so that the weight to be carried is divided equally between the bearings, and such bearings being also constructed to accommodate the wear which may take place by being self adjusting due to the balance feature.

A particular application of my invention is in the swivel of rotary drills in which a flushing liquid may be run into the drill stem or the like. In the prior practice it has been customary to utilize a single horizontal bearing but there are limits to the use of this in deep well drilling on account of the amount of weight which may be placed upon the bearing. There are also limits to the diameter of the bearing which make it impracticable to increase the diameter in order to accommodate greater weight. Therefore, with my type of balanced thrust bearing for a rotary swivel or other structure, with the bearings positioned one above the other and with the weight balanced or supported uniformly on each of the bearings, I am enabled to provide a bearing which will carry a much increased weight over the common practice.

In constructing my bearing in connection with a rotary swivel for deep well drilling I provide a suitable casing structure which is connected to a swiveled bail and the rotary tubular drill pipe, or it is connected thereto extends upwardly through the casing. A plurality of balancing levers extend peripherally around the base of the casing, the inner ends of these levers supporting the lower race of a lower set of anti-friction bearings, the outer ends of these levers supporting a rigid ring, this ring having a connection with the lower race of an upper set of anti-friction bearings. The inner races of the upper and lower sets are connected through suitable supporting structure to the weight to be carried so that the weight carried by the bearings is evenly balanced between the upper and lower set of anti-friction bearings.

My invention in its various aspects will be more readily understood from the following description and drawings, in which:

Figure 1 is a side elevation of one application of my invention, this being a rotary drill swivel having a flushing attachment.

Figure 2 is a vertical section on the line 2—2 of Fig. 1, taken in the direction of the arrows.

Figure 3 is a horizontal section on the line 3—3 of Fig. 2, in the direction of the arrows.

Figure 4 is a horizontal section on the line 4—4 of Fig. 2, in the direction of the arrows.

The fixed structure of my balanced thrust bearing is constructed substantially as follows:

A casing designated generally by the numeral 1 preferably has a cylindrical wall section 2 and a horizontal base portion 3 with a depending tubular section 4. Gudgeons 5 are connected to the opposite portions of the side walls and a ball 6 is swivelly connected to the gudgeons. The cap 7 is secured to the upper part of the walls of the casing, there being a suitable flange with bolts or screws, or other suitable connection. This cap has an upwardly extending neck 8. The base preferably has a circular ring 9 forming an insert of hardened metal, for the purpose hereunder set forth.

The rotary weight carrying structure is constructed substantially as follows:

A tube 10, which usually has tapered threads 11 at the lower end, is designed to be connected to a structure 12 for transmitting rotary motion and designated generally in the trade as a "kelley". A fixed bushing 13 is fitted in the base and takes up lateral thrust of the lower portion of the tube 10. There is usually a packing 14 with a gland 15 securing same in place, the gland being threaded into the open end of the tubular section 4 of the casing. An upper bushing 16 is fitted in the neck and takes the lateral thrust of the upper part of the tube 10, there being preferably a packing 17 with an upper gland 18, the gland being threaded in the open end of the neck. A feed pipe 19 for the flushing fluid is swivelly connected to the upper end of the tube 10.

The balanced bearing structure and its details is substantially as follows:

A series of balancing levers 20 are supported on the inserts 9, these inserts each having a groove 21 formed straight from one side to the other of each insert. The levers are thus small sectors of a ring, each being separate one from the other on radial joint lines. The levers have a rocking rib 22 in the base fitting in the groove 21. The inner ends of the levers have knobs 23 which engage in grooves 24 of supporting rings 25. These rings are annular and preferably flat on the upper surface and support the lower race 26 of the lower anti-friction bearing 27, there being a series of preferably balls 28 between the lower race and the upper race 29. This upper race has a tight sliding fit on the tube 10.

A cylindrical ring 30 fits in notches 31 adjacent the outside edge of the balancing levers and the upper rim of the ring 30 is engaged by a flat pressure ring 32. This ring is illustrated as tapered and engages the lower race 33 of the upper anti-friction bearing 34, this bearing having balls or the like 35 between the lower race and the upper race 36. The lower race 33 preferably has a tight sliding fit with the casing walls 2.

A sleeve 37 has a tight fit on the tube 10 and the upper race 36 has a tight fit on this sleeve. At the lower end of the sleeve is a pressure plate 38 which also is formed with an outward taper, this plate bearing against the upper race 29 of the lower anti-friction bearing. A heavy flange 39 is secured to the tube 10 and engages the upper race 36 of the upper anti-friction bearing and also the upper edge of the sleeve 37.

The manner of functioning and action of my balanced thrust bearing is substantially as follows:

The casing is suitably supported and there being a weight attached to the lower end of the tube 10, this weight being the various drilling tools and the pipes connecting the same. The pressure is transmitted from the flange 39 to the upper ball race 36 which rotates with such flange and with the tube. The pressure is carried downwardly through the balls 35 to the lower race 33 of the upper anti-friction bearing. At the same time pressure is transmitted downwardly through the sleeve 37 onto the inner part of the pressure plate 38, transmitting pressure to the upper race 29 of the lower anti-friction bearing. The pressure from the lower race 33 of the upper anti-friction bearing, which is stationary in the casing, is transmitted through the pressure ring 32 to the cylindrical ring 30 and hence to the outer ends of the balancing set of levers 20. These levers transmit the pressure to the supporting rings 25, which in turn carry the pressure to the lower race 26 of the lower anti-friction bearing, thus both the lower and upper race of such bearing carrying the proportion of the load.

It is immaterial which way the pressure is considered as transmitted, whether from the flange 39 through the sleeve 37 and the pressure plate 38, or through the pressure ring 32 and cylindrical ring 30 to the balancing levers. It will be seen that these levers function to allow slight up and down movement of the lower anti-friction bearing until the pressure is equally divided between the upper and the lower bearing. These parts would normally be made in proportion so that when assembled the pressure would be equally divided between the upper and lower bearing, however, as the bearings wear during use the balancing device equalizes the pressure and maintains an even distribution of same. It will be understood that the casing will be filled to the desired extent with a lubricating fluid to reduce to the minimum the frictional wear.

It will thus be seen that I have devised a balanced thrust bearing in which a plurality of anti-friction bearings are positioned one above the other and the bearing stresses of a vertical load are transmitted from one bearing to the other. This type of bearing may also be utilized in regard to a horizontal or other positioned shaft or the like in which it is desired to reduce the diameter of a bearing by increasing the number of bearing parts and balancing these so that the load will be equally distributed. A device similar to my construction might be utilized for a thrust bearing at the base of a shaft instead of at the top as illustrated.

Various changes may be made in the principles of my invention without departing from the spirit thereof, as set forth in the description, drawings, and claims.

I claim:

1. A thrust bearing comprising in combination a casing having a shaft extending longitudinally therethrough, a first upper bearing race secured to said shaft, a first lower race free from the casing and from the shaft, a set of balls between said races, a pressure ring tapered inwardly and having a thick outer edge with an annular notch, a cylindrical ring fitting in the annular notch of the pressure ring, a series of balancing levers pivoted in the base of the casing, the cylindrical ring having a bearing on the outer end of said levers, a supporting ring engaging the inner end of said levers, the supporting ring extending outwardly and inwardly from the point of support on the levers, a second lower bearing race on the supporting ring free from the shaft and from the cylindrical ring, a second upper bearing race secured to the shaft and supported by a pressure plate secured to the shaft, a series of balls between the said second lower bearing race and the second upper bearing race.

2. A thrust bearing comprising in combination a casing having a shaft extending longitudinally therethrough, an upper bearing connected to the shaft, a pressure ring engaging the bearing and having an annular notch, a cylindrical ring fitting in the said notch of the pressure ring, a series of balancing levers pivoted on the base of the casing, the ring bearing on the outer ends of the levers, a supporting ring engaging the inner ends of the levers and extending outwardly and inwardly from the point of support, and a lower bearing mounted on said supporting ring and connected to the shaft.

In testimony whereof I have signed my name to this specification.

JOHN M. MELOTT.